US008612537B2

(12) United States Patent
Bhogal et al.

(10) Patent No.: US 8,612,537 B2
(45) Date of Patent: Dec. 17, 2013

(54) AUTOMATED DATA UPDATING IN DISTRIBUTED NOTICES

(75) Inventors: Kulvir S. Bhogal, Pflugerville, TX (US); Lisa Seacat DeLuca, San Francisco, CA (US); William A. Griffith, Austin, TX (US); Yen-Kwang Lin, Raleigh, NC (US); Dana L. Price, Cary, NC (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/982,580

(22) Filed: Dec. 30, 2010

(65) Prior Publication Data
US 2012/0173608 A1 Jul. 5, 2012

(51) Int. Cl.
*G06F 15/167* (2006.01)
(52) U.S. Cl.
USPC ............ 709/216; 709/201; 709/203; 709/217
(58) Field of Classification Search
USPC .................................. 709/201, 203, 216, 217
See application file for complete search history.

(56) References Cited

U.S. PATENT DOCUMENTS

| 6,823,357 | B1 * | 11/2004 | Du et al. ........................ 709/203 |
| 8,171,104 | B2 * | 5/2012 | Qi .................................. 709/217 |
| 2004/0083118 | A1 * | 4/2004 | Thakkar et al. ...................... 705/1 |
| 2006/0075050 | A1 | 4/2006 | Kanatani et al. |
| 2009/0259674 | A1 | 10/2009 | Griffin et al. |
| 2011/0040834 | A1 * | 2/2011 | Schaefer et al. ............... 709/204 |
| 2011/0137992 | A1 * | 6/2011 | Michel et al. ................ 709/204 |

\* cited by examiner

*Primary Examiner* — Phuoc Nguyen
(74) *Attorney, Agent, or Firm* — Steven Greenberg, Esq.; Carey, Rodriguez, Greenberg & O'Keefe

(57) ABSTRACT

Embodiments of the present invention provide a method, system and computer program product for automated data updating of notices in a calendaring and scheduling (C&S) system. In an embodiment of the invention, a method for automated data updating of notices in a C&S system can be provided. The method can include composing a C&S document in a C&S system executing in memory by at least one processor of a computer. The method further can include noticing different users addressed for the C&S document and adding to the C&S document a reference to variable data stored separately from the C&S document. The method yet further can include detecting a change in the variable data. Finally, the method can include transmitting notice to the different users of the change in variable data. In one aspect of the embodiment, transmitting notice to the different users of the change in variable data can include flagging the C&S document as having changed.

19 Claims, 2 Drawing Sheets

```
210          Calendar Entry (ID 12345)

Subject: [ Meeting with Customer ]

When  Starts: [Thu 10/15/2009] [03:45PM] [GMT]
      Ends:   [Thu 10/15/2009] [04:45PM] [GMT]

Who  Required: [user1@company.com; user2@company.com]
     Optional: [user3@vendor.com]
         FYI:  [                    ]
                                              230
     Where: 220 [Conference Room A]    [x] Variable Data
     Call In: 220 [866-123-4567]       [x] Variable Data
                                              230
```

AUTOMATED DATA UPDATING IN DISTRIBUTED NOTICES

BACKGROUND OF THE INVENTION

1. Field of the Invention

The present invention relates to calendaring and scheduling (C&S) and more particularly to updating distributed notices in a C&S system.

2. Description of the Related Art

Calendaring and scheduling (C&S) systems have formed the core component of personal information management software and firmware applications for decades. Initially, a mere calendar display, modern calendaring systems provide scheduling and alarm functions in addition to full integration with contact management, time entry, billing and project management applications. The typical calendaring application for a C&S system minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Integral to the modern C&S system is the transmission of notice to an event, task, or memorandum to different users. For example, an end user can notice other users of a planned event, a common task, or a common document. The notice can include therein important—sometimes critical data—that is variable to the notice. For example, the variable data can include a passcode for a teleconference, a password to access stored data to name only two such examples. Ordinarily, the incorporation of variable data within notice of an event, task or memorandum is without consequence as the variable data will remain valid and unchanged throughout the relevant lifespan of the notice. However, in certain circumstances, the variable data can change during the relevant lifespan of the notice.

Specifically, some passcodes are required to change periodically at a specified interval in order to preserve security. Examples include passcodes to conferencing systems and secure data repositories. As such, though the incorporation of a passcode required to change periodically within a notice to other users of the C&S system may be valid at the time of transmitting the notice, after some period of time has elapsed the passcode will have become invalid. The only way to avoid the attempted use of an invalid passcode then, is to manually locate the errant notice and re-notice the users of the new passcode. In the circumstance of a meeting invite, the underlying meeting invite can be located and modified resulting in new notice being sent to the invited users.

BRIEF SUMMARY OF THE INVENTION

Embodiments of the present invention address deficiencies of the art in respect to notice management in a C&S system and provide a novel and non-obvious method, system and computer program product for automated data updating of notices for documents in a C&S system to account for changes in variable data disposed externally to the document. In an embodiment of the invention, a method for automated data updating of notices for documents in a C&S system to account for changes in variable data disposed externally to the document can be provided. The method can include composing a C&S document in a C&S system executing in memory by at least one processor of a computer. The method further can include noticing different users addressed for the C&S document and adding to the C&S document a reference to variable data stored separately from the C&S document. The method yet further can include detecting a change in the variable data. Finally, the method can include transmitting notice to the different users of the change in variable data. In one aspect of the embodiment, transmitting notice to the different users of the change in variable data can include flagging the C&S document as having changed.

In another embodiment of the invention, a C&S data processing system can be configured for automated data updating of notices for documents to account for changes in variable data disposed externally to the document. The system can include a C&S system executing in memory by at least one processor of a host server, the C&S system managing different C&S documents created by different users of the C&S system. The C&S documents can include, by way of example, an event, task, shared document or e-mail message, to name a few possibilities. The system also can include a data store of C&S documents managed by the C&S system. The system yet further can include different C&S clients communicatively coupled to the C&S system over a computer communications network, each C&S client individually executing in a corresponding computer and providing a user interface to a user to access C&S documents in the data store.

Finally, the system can include auto-update logic coupled to the C&S system and the C&S clients. The logic can include program code enabled to detect a change in separately stored variable data referenced by a C&S document in the data store and to transmit notice to different users associated with the C&S document referencing the separately stored variable data of the change in the variable data. Further, the program code of the logic can be enabled to transmit notice to the different users of the change in variable data by flagging the C&S document referencing the separately stored variable data as having changed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method system and computer program product for automated data updating of notices for documents in a C&S system to account for changes in variable data disposed externally to the documents. In embodiment of the invention, a notice can be provided to different users in a C&S system. The notice can include a reference to remotely stored variable data, such as a password, access code, user identifier, location, address, telephone number, network address and the like. Alternatively, the notice can refer to a C&S document such as a scheduled event (meeting or appointment), task or shared document and the C&S document can include a reference to the remotely stored variable data. Thereafter, responsive to detecting a change in the remote variable data, notice automatically can be retransmitted to the users whom had received the notice previously without requiring manual composition and transmission of the updated notice. Additionally, or alternatively, the C&S document referred to by the notice can be flagged as updated causing a resulting notice to be automatically sent to those users implicated by the C&S document.

Figures 1, 2:
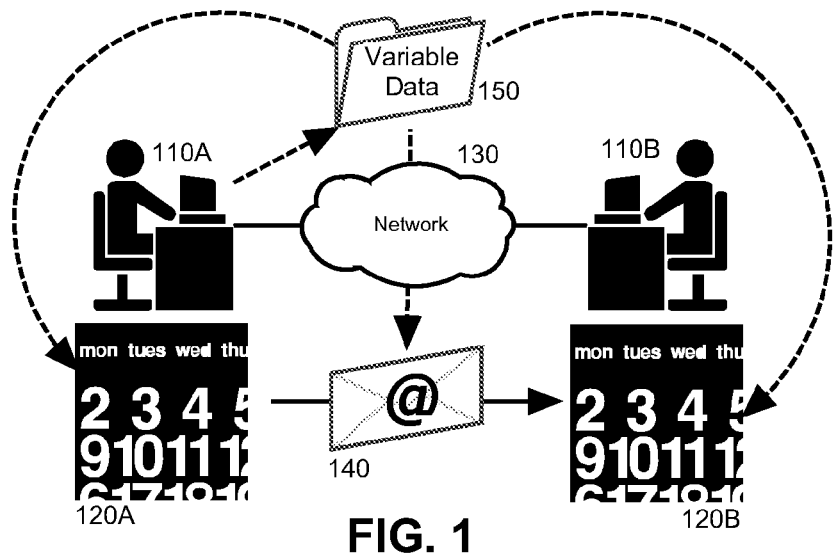
FIG. 1 is pictorial illustration of a process for automated data updating of notices for documents in a C&S system to account for changes in variable data disposed externally to the document.
FIG. 2 is a screen shot of a C&S system meeting invite form configured for automated data updating of notices for the invite to account for changes in variable data disposed externally to the invite.

In further illustration, FIG. 1 pictorially shows a process for automated data updating of notices in a C&S system. As shown in FIG. 1, an originating user 110A can establish a C&S document 120A, 120B implicating a recipient user 110B. The C&S document 120A, 120B can be a meeting, task or shared document, by way of example and the recipient user 110B can referenced as an invitee to the C&S document 120A, 120B. Corresponding notice 140 can be provided over computer communications network 130 to the recipient user 110B, such as a meeting invite in the case the C&S document 120A, 120B is a meeting. Both the notice 140 and the C&S document 120A, 120B can include a reference to remotely disposed variable data 150. Consequently, when the variable data changes 150, the recipient user 110B can be automatically informed of the change either by providing in automated fashion a new form of the notice 140, by flagging the C&S document 120A, 120B as having changed thereby triggering a new form of the notice 140, or both.

In further illustration, referring to FIG. 2, an exemplary user interface to a C&S meeting invite is shown. As shown in FIG. 2, a C&S meeting invite 210 can include a number of fields into which static and variable data can be provided. Individual ones of the fields that include variable data 220 can be marked as such using variable data control 230. In response to selecting the variable data control 230 for a corresponding field of variable data 220, when notice of the meeting is provided to the designated recipients, the notice can include in place of the actual value of the variable data 220, a reference to a storage location for the variable data 220 separate from the invite—namely a table. The separate storage location can store the variable data 220 in reference to an identifier for the invite and a location in the invite such as a field. In this way, when a change is applied to the variable data 220 in the separate storage location, the notices for the invite will automatically change without necessitating an updated notice to be sent to the recipients of the invite.

Figure 3:
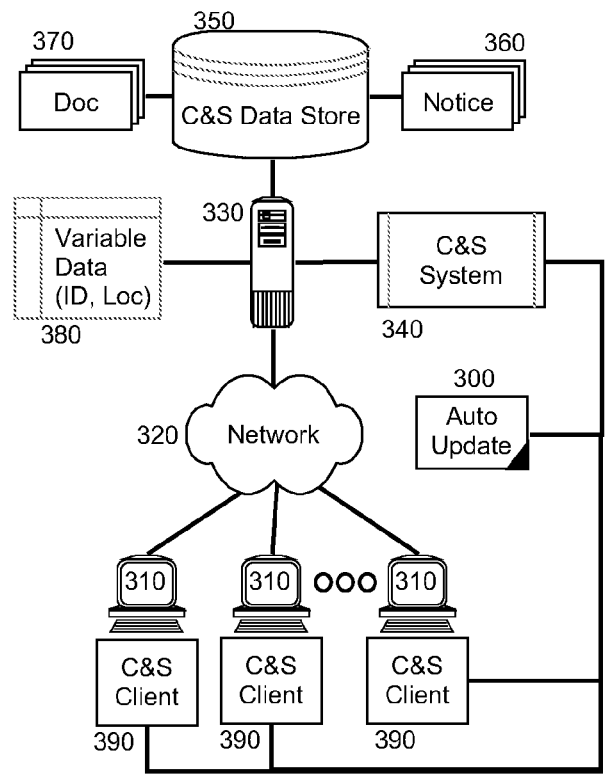
FIG. 3 is a schematic illustration of a C&S data processing system configured for automated data updating of notices for documents to account for changes in variable data disposed externally to the document; and, FIG. 4 is a flow chart illustrating a process for automated data updating of notices for documents in a C&S system to account for changes in variable data disposed externally to the document.

The process described in connection with FIG. 1 can be implemented within a C&S data processing system. In yet further illustration, FIG. 3 schematically shows a C&S data processing system configured for automated data updating of notices. The system can include a host server 330 communicatively coupled to different client computers 310 over computer communications network 320. Each of the client computers 310 can support the operation of a C&S client 390 accessing C&S documents 370 and notices 360 of C&S documents 370 in a C&S data store 350 through C&S system 240 hosted by host server 230. Of note, variable data 380 can be separately stored from the C&S documents 370 and associated with the C&S documents not only by an identifier for the C&S documents but also by a location within the C&S documents, such as a field. Notwithstanding, though stored separately from the C&S documents 370, the variable data 380 can remain accessible by the C&S system and therefore the different C&S clients 390.

Each C&S client 390 can include program code enabled upon execution by at least one processor of a corresponding one of the client computers 310 to manage different C&S documents 370 on behalf of one or more user, such as e-mail messages, tasks, appointments, meetings, chat sessions, shared documents and the like. Notices 360 of the C&S documents 370 can include, by way of example, another form of a C&S document 370, such as an e-mail message. In this regard, upon establishing a C&S document 370 implicating one or more users, corresponding notice 360 of the C&S document 370 can be transmitted to each of the users through C&S system 340 and access by the users through respective ones of the C&S clients 390.

Importantly, auto-update logic 300 further can be coupled to each of the C&S clients 390 and the C&S system 340 (executing in respective ones of the client computers 210 or the host server as the case may be). The auto-update logic 300 can include program code enabled upon execution to include in a notice 360 to a C&S document 370 a reference to externally disposed variable data 380. Additionally, or alternatively, the program code of the auto-update logic 300 further can be enabled upon execution to include in a C&S document 370 a reference to externally disposed variable data 380. In either or both circumstances, the program code of the auto-update logic 300 can be enabled to detect a change in the externally disposed variable data 380 and to retransmit a new form of the notice 360 to associated users indicating the changed externally disposed variable data 380. Additionally, or alternatively, the program code of the auto-update logic 300 can be enabled upon detecting a change in the externally disposed variable data 380 to flag the corresponding C&S event 370 as having been modified thereby triggering a new form of the notice 380 to associated users. Optionally, the operation of detecting changes to the externally disposed variable data 380 and triggering a new form of the notice 380 can be performed in logic coupled to the C&S system 340.

Figure 4:
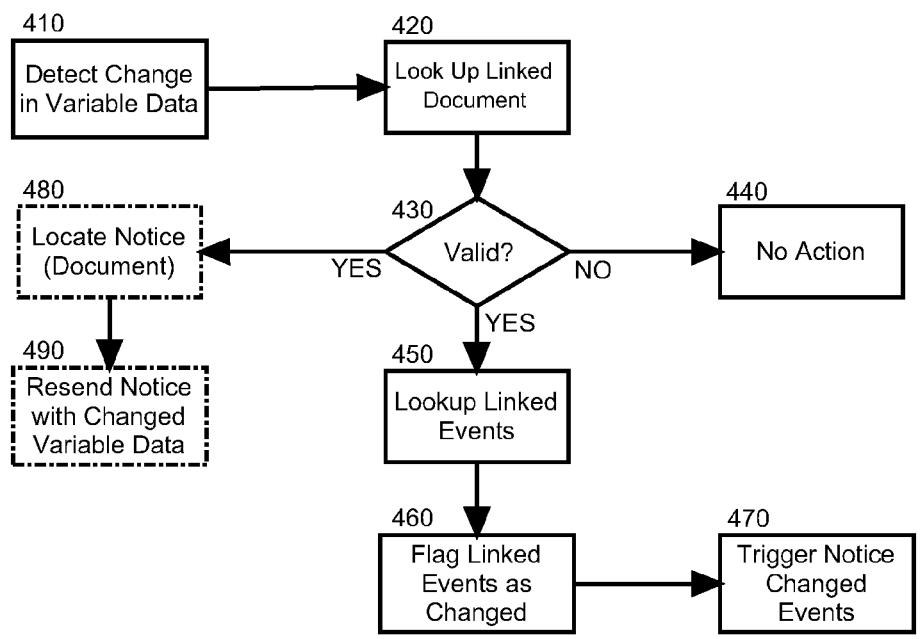

In even yet further illustration of the operation of the auto-update logic 300, FIG. 4 is a flow chart illustrating a process for automated data updating of notices in a C&S system. Beginning in block 410, a change can be detected in externally disposed variable data referenced by a C&S document such as an event, task, message or shared document. In response, in block 420, a linked document associated with the changed variable data can be identified and in block 430, it can be determined if the document remains valid or has expired—either through operation of the passage of an expiration date for the document, or in the case of a calendared event or task, given the passage of the date assigned to the task or event. If the document is determined not to be valid, in block 440 no action can be taken. Otherwise the process can continue through blocks 450 and 480.

In this regard, in one aspect of the embodiment, in block 450 the linked document can be flagged as having changed and in block 460 a notice can be triggered for the changed document. In another aspect of the embodiment, in block 480 one or more notices linked to the document can be identified for example as stored in a table relating the variable data to different notices or recipients of different notices. Thereafter, in block 490, a new form of notice for the C&S document can be resent to corresponding recipients indicating the changed variable data. In this way, the variable data for a C&S document can be allowed to change periodically without requiring the tedious manual intervention of the end user in notifying all implicated recipients.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for automated data updating of notices in a calendaring and scheduling (C&S) system, the method comprising:
    composing a C&S document in a C&S system executing in memory by at least one processor of a computer;
    noticing a plurality of different users addressed for the C&S document;
    adding to the C&S document a reference to variable data stored separately from the C&S document;
    detecting a change in the stored variable data; and,
    transmitting notice to the different users of the change in the stored variable data.

2. The method of claim 1, wherein transmitting notice to the different users of the change in the stored variable data comprises flagging the C&S document as having changed.

3. The method of claim 1, wherein the C&S document is an event.

4. The method of claim 1, wherein the C&S document is a task.

5. The method of claim 1, wherein the C&S document is a shared document.

6. The method of claim 1, wherein the notice is an e-mail message.

7. A calendaring and scheduling (C&S) data processing system configured for automated data updating of notices, the system comprising:
    a C&S system executing in memory by at least one processor of a host server, the C&S system managing different C&S documents created by different users of the C&S system;
    a data store of C&S documents managed by the C&S system;
    a plurality of C&S clients communicatively coupled to the C&S system over a computer communications network, each C&S client individually executing in a corresponding computer and providing a user interface to a user to access C&S documents in the data store; and,
    auto-update logic coupled to the C&S system and the C&S clients, the logic comprising program code enabled to detect a change in separately stored variable data referenced by a C&S document in the data store and to transmit notice to different users associated with the C&S document referencing the separately stored variable data of the change in the variable data.

8. The system of claim 7, wherein the program code of the logic is enabled to transmit notice to the different users of the change in variable data by flagging the C&S document referencing the separately stored variable data as having changed.

9. The system of claim 7, wherein the program code of the logic is enabled to transmit notice to the different users of the change in variable data only if the C&S document is determined not to have expired.

10. The system of claim 7, wherein the C&S document is an event.

11. The system of claim 7, wherein the C&S document is a task.

12. The system of claim 7, wherein the C&S document is a shared document.

13. The system of claim 7, wherein the notice is an e-mail message.

14. A computer program product for automated data updating of notices in a calendaring and scheduling (C&S) system, the computer program product comprising:
    a computer readable storage medium having computer readable program code embodied therewith, the computer readable program code comprising:
    computer usable program code for composing a C&S document in a C&S system executing in memory by at least one processor of a computer;
    computer usable program code for noticing a plurality of different users addressed for the C&S document;
    computer usable program code for adding to the C&S document a reference to variable data stored separately from the C&S document;
    computer usable program code for detecting a change in the stored variable data; and,
    computer usable program code for transmitting notice to the different users of the change in the stored variable data.

15. The computer program product of claim 14, wherein the computer usable program code for transmitting notice to the different users of the change in the stored variable data comprises computer usable program code for flagging the C&S document as having changed.

16. The computer program product of claim 14, wherein the C&S document is an event.

17. The computer program product of claim 14, wherein the C&S document is a task.

18. The computer program product of claim 14, wherein the C&S document is a shared document.

19. The computer program product of claim 14, wherein the notice is an e-mail message.

* * * * *